Sept. 22, 1970  R. E. MITTON  3,529,872
HYDRAULIC BRAKE APPARATUS FOR VEHICLES
Filed March 3, 1969  2 Sheets-Sheet 1
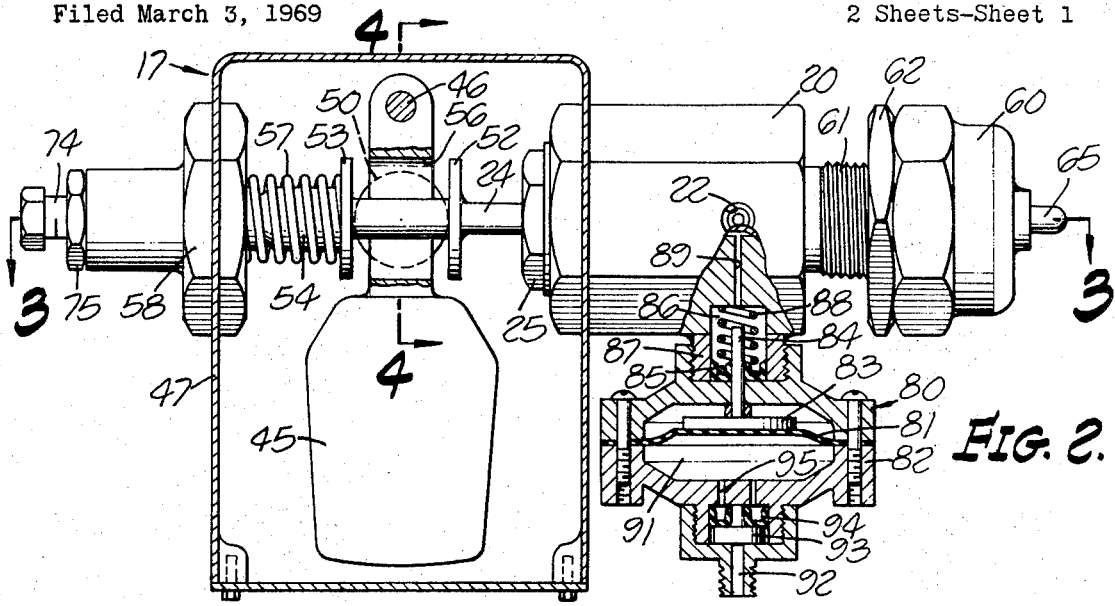
FIG. 2.
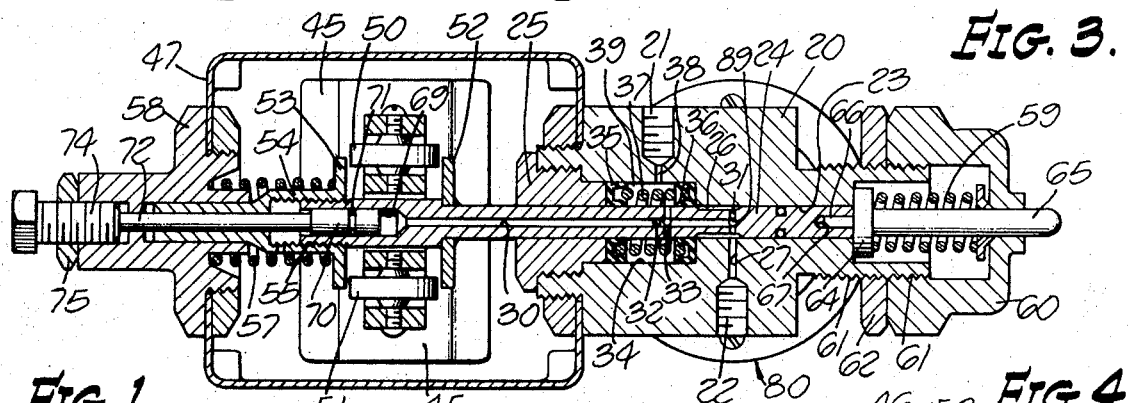
FIG. 3.
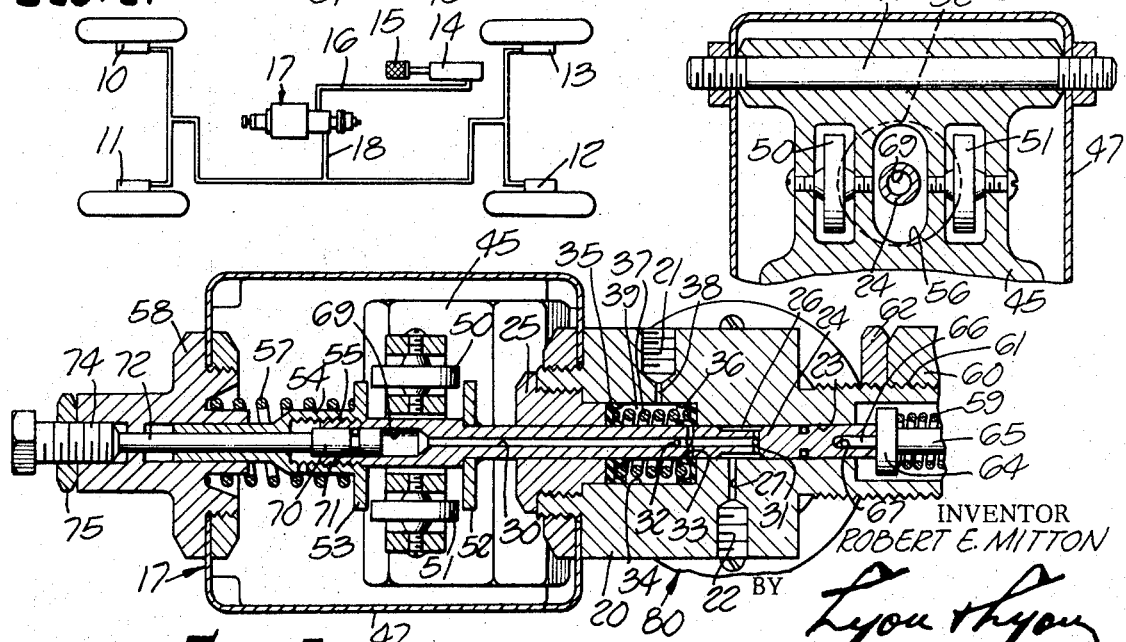
FIG. 1.
FIG. 4.
FIG. 5.
INVENTOR
ROBERT E. MITTON
BY
ATTORNEYS

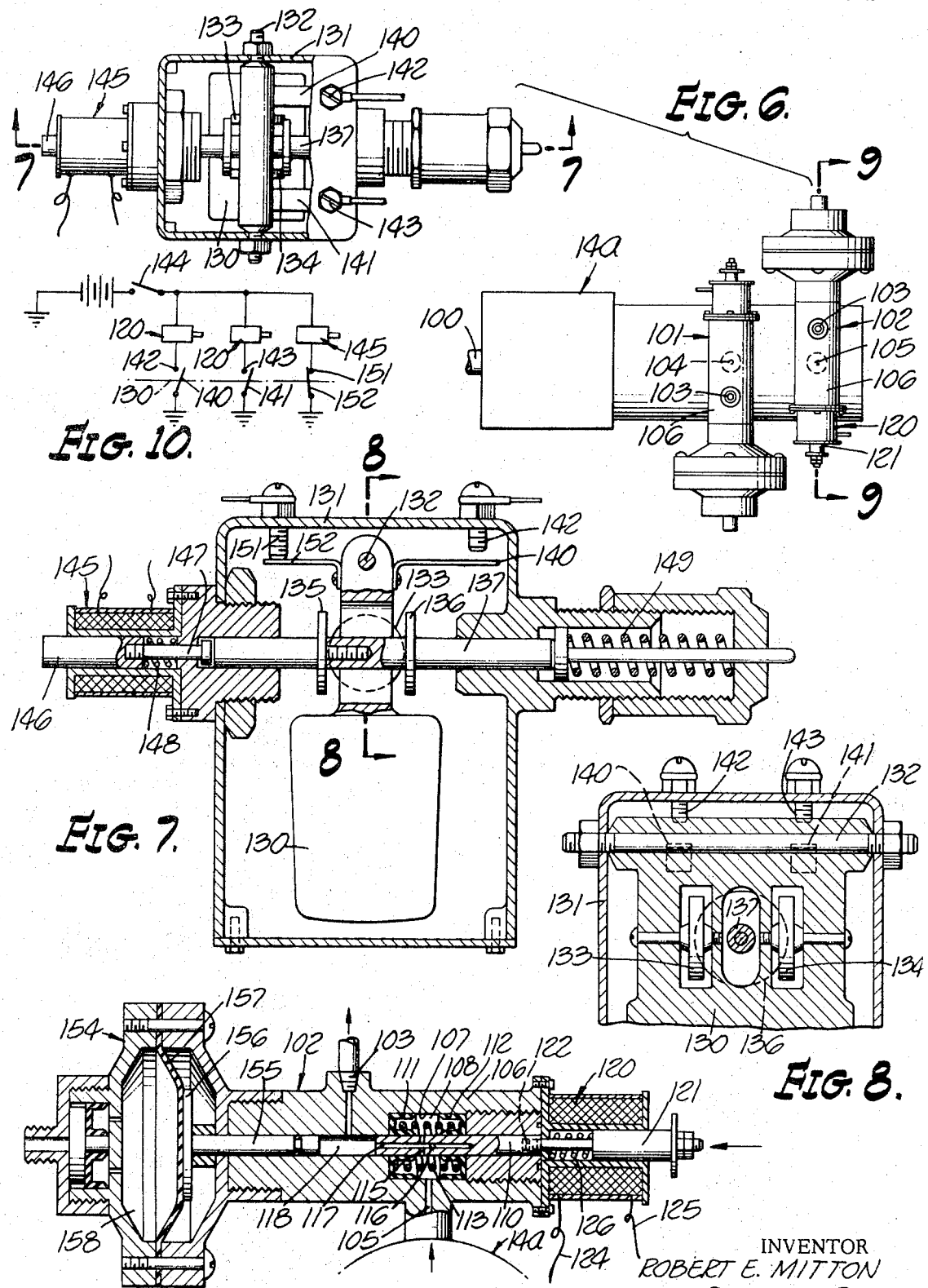

United States Patent Office 3,529,872
Patented Sept. 22, 1970

3,529,872
HYDRAULIC BRAKE APPARATUS FOR VEHICLES
Robert E. Mitton, San Diego, Calif., assignor of forty-five percent to E. Forrest Jones, San Diego, Calif., and ten percent to Charles M. Wormington, El Cajon, Calif.
Filed Mar. 3, 1969, Ser. No. 803,850
Int. Cl. B60t 8/00, 13/14, 8/14
U.S. Cl. 303—24    1 Claim

ABSTRACT OF THE DISCLOSURE

Pressure limiting apparatus is interposed between the master cylinder and the wheel cylinders in a hydraulic brake system on a vehicle in order to insure continued rotation of the wheels during maximum braking effort. A valve device cuts off communication between the master cylinder and the wheel cylinders, under influence of an inertia weight actuated by deceleration of the vehicle. Also, a hydraulic accumulator limits the intensity of hydraulic pressure initially applicable to the wheel-cylinder assemblies.

This invention relates to hydraulic brake systems for wheeled vehicles such as, for example, automobiles and trucks. In such hydraulic brake systems, it is common to employ a friction brake and hydraulic actuator at each wheel, the hydraulic actuator being known in the art as a wheel cylinder. Each of these wheel cylinders is connected by a hydraulic line to a master cylinder, usually operated by a foot pedal. Pressure on the pedal causes the master cylinder to exert equal pressure on each of the wheel cylinders.

It is highly desirable, when applying the hydraulic brakes on a moving vehicle, to avoid stopping the rotation of one or more of the wheels during the process of decelerating the vehicle. If one or more of the wheels is "locked up" while the vehicle is decelerating, the overall braking effect is reduced, and more importantly, the vehicle may skid and go out of control. Accordingly, it is a general object of this invention to provide a device which is effective during breaking of a vehicle to regulate the force which may be exerted by the master cylinder through the hydraulic lines to the wheel cylinders, to prevent "lock up" of one or more of the vehicle wheels. Another object is to provide such a device having inertia means actuated by deceleration of the vehicle for cutting off hydraulic communication between the master cylinder and the wheel cylinders. Another object is to provide hydraulic accumulator means limiting the intensity of hydraulic pressure initially applicable to the wheel-cylinder assemblies. Other and more detail objects and advantages will appear hereinafter.

In the drawings, FIG. 1 is a schematic diagram showing wheeled vehicle equipped with hydraulic brakes and illustrating one form of device embodying this invention.

FIG. 2 is a side elevation partly in section illustrating a preferred embodiment of this invention.

FIG. 3 is a sectional plan view taken substantially on the lines 3—3 as shown in FIG. 2.

FIG. 4 is a transverse sectional detail taken substantially on the lines 4—4 as shown in FIG. 2.

FIG. 5 is a view similar to FIG. 3 illustrating the internal parts in another position.

FIG. 6 is a plan view partly broke away showing a modification.

FIG. 7 is a side elevation taken substantially on the lines 7—7 as sown in FIG. 6.

FIG. 8 is a transverse sectional detail taken substantially on the lines 8—8 as shown in FIG. 7.

FIG. 9 is a sectional elevation taken substantially on the lines 9—9 as shown in FIG. 6.

FIG. 10 is a schematic wiring diagram of the form of the invention shown in FIGS. 6–9.

Referring to the drawings, the vehicle shown diagrammatically in FIG. 1 has four wheels each provided with its own friction brake, not shown, and each having a wheel-cylinder assembly 10, 11, 12 and 13. A master cylinder assembly 14 operated by a brake pedal 15 pressurizes hydraulic fluid in a line 16 leading to a pressure limiter assembly 17 embodying this invention. Hydraulic fluid under pressure passes from the assembly 17 through hydraulic lines 18 leading to the individual wheel-cylinder assemblies.

In the preferred embodiment of the invention shown in FIGS. 2–5 the device 17 includes a valve body 20 mounted on the vehicle and provided with an inlet port 21 for the hydraulic line 16 leading from the master cylinder 14 and provided with an outlet port 22 for connection to the hydraulic line 18 leading to the individual wheel cylinders. A longitudinal bore 23 in the body 20 extending in the direction of movement of the vehicle slidably receives a ported stem 24. This stem extends completely through the valve body 20 and through a bushing 25 which forms one end thereof. An external groove 26 in the stem 24 communicates with the body passage 27 leading to the port 22.

The stem 24 is provided with a central axial passageway 30 terminating in a transverse passage 31 in communication with the groove 26. The stem 24 has additional transverse passages 32 and 33 communicating with the longitudinal passageway 30 and with the counterbore 34 provided in the valve body 20. This counterbore is closed by the bushing 25. Seal ring cups 35 and 36 are provided at opposite ends of the counterbore 34 and are spread by a compression spring 37. The inlet port 21 communicates with the counterbore through passage 38. From this description it will be understood that hydraulic fluid under pressure admitted through port 21 passes through passage 38 into chamber 39 within the counterbore 34 and between the seal ring cups 35 and 36. In the position of the parts shown in FIG. 3 of the drawings, the cross bores 32 and 33 in the stem 24 communicate with the chamber 39 and hence hydraulic fluid pressure in the chamber passes through the longitudinal passageway 30 and through cross bore 31 into the groove 36, and through passageway 27 to outlet port 22. When the stem 24 is shifted to the position shown in FIG. 5, the outlet port 22 is still connected to the groove 26 through passage 27, but both of the cross bores 32 and 33 have moved under the inner lip of the sealing cup 36 and hence communication between the chamber 39 and the longitudinal passageway 30 in the stem 24 is cut off.

Inertia means are provided for shifting the ported stem 24 from the position shown in FIG. 3 to the position shown in FIG. 5, in response to deceleration of the vehicle brought about by the initial braking action. As shown in the drawings, this inertia means comprises a metal weight in the form of a pendulum 45 mounted to swing on a transverse pivot pin 46. The pin 46 is fixed to a stationary shell 47 fixed to the valve body 20 and providing an enclosure for the pendulum 45 and associated mechanism. As best shown in FIG. 4, the pendulum 45 carries a pair of axially spaced rollers 50 and 51 positioned to contact parallel flanges 52 and 53. The flange 52 is fixed to the stem 24, and the flange 53 is fixed on a stem extension 54 connected to the stem by threads 55. When the pendulum 45 swings in a counterclockwise direction, as viewed in FIG. 2, the pendulum rollers 50 and 51 contact the flange 42 to move the ported stem 24 to the right. An elongated opening 56 in the pendulum 45 provides clearance for the stem 24.

When the pendulum 45 swings in a clockwise direction, as viewed in FIG. 2, the pendulum rollers 50 and 51 engage the flange 43 and move the stem 24 in a direction to compress the coil spring 57 interposed between the flange 53 and the closure 58. A similar spring 59 is positioned in a body extension 60 connected to the body 20 by threads 61 and secured in adjusted position by lock nut 62. The springs 57 and 59 oppose each other and act resiliently to hold the parts in the "rest" position as shown in FIG. 3. When the pendulum 45 swings to the operative position as shown in FIG. 5, the spring 59 is compressed, and the spring 57 is extended. A spring 59 bears against the flange 64 on the rod 65. A pilot pin 66 on the rod 65 projects into a central blind opening 67 in the end of the stem 24. The rod 65 and flange 64 function as an integral part of the stem 24.

Means are provided for initiating movement of the stem 24 from the position shown in FIG. 3 toward the position shown in FIG. 5, as soon as hydraulic pressure appears at the inlet port 21, and prior to any substantial deceleration of the vehicle. The stem 24 is provided with an enlarged bore 69 communicating with the longitudinal bore 30. A piston 70 having a seal ring 71 thereon is slidably mounted in the bore 69. The piston is carried on the end of a rod 72 slidably mounted in the stem extension 54. The projecting end of the rod contacts the adjustable stop screw 74 threaded into the closure 58 and held in adjusted position by means of the lock nut 75.

Hydraulic pressure admitted into the chamber 39 from the inlet 21 passes into the longitudinal passageway 30 through the cross bores 32 and 33, and this pressure is communicated into the bore 69. Since the piston 70 is prevented from movement toward the left, as viewed in FIG. 3, by contact of the rod 72 with the stop screw 74, pressure in the bore 69 acts to partially shift the stem 24 toward the right, in a direction to cut off communication between the chamber 39 and the longitudinal passageway 30 in the stem 24. This force applied to the stem 24 in advance of substantial deceleration of the vehicle serves to eliminate any lost motion between the pendulum 45 and the stem 24, and insures that relative motion of the pendulum 45 at the time of deceleration of the vehicle will not involve any substantial delay in the action of the pendulum to shut off communication between the master cylinder 14 and the wheel cylinders 10–12.

Means are provided for regulating the intensity of hydraulic pressure initially applied to the wheel-cylinder assemblies. As best shown in FIG. 2 of the drawings, this means includes a hydraulic accumulator 80 having a flexible diaphragm 81. The outer periphery of the diaphragm 81 is clamped between mating halves of the shell 82. A metal disc 83 stiffens the central portion of the diaphragm 81 and a post fixed to the disc 83 projects through a seal ring 85 and into high pressure chamber 86 formed within the valve body 20 and threaded extension 87. A spring 88 in the chamber 86 maintains the seal ring 85 in position. A passage 89 in the valve body 20 extends from the bore 23 to the chamber 86, so that when the parts are in the position shown in FIGS. 2 and 3, pressure in the chamber 39 is communicated through cross bores 32 and 33 to the longitudinal passageway 30 and then through cross bores 31 to the groove 26 and then through passage 89 to the chamber 86.

The exposed end of the post 84 is subjected to pressure of the hydraulic fluid, thereby applying a downward force on the post 84. This force is resisted by air pressure within the low pressure chamber 91 within the shell 82 and below the diaphragm 81. The air pressure acts over the relatively large exposed area of the diaphragm 81, whereas the hydraulic pressure in chamber 86 acts only on the exposed end of the post 84. Air pressure is admitted into the space 91 through the coupling connection 92, past the disc 93 and past the outer periphery of the cup shaped seal ring 94 and through ports 95 into the chamber 91. The device acts to compensate for surge shocks occasioned by out of round brake drums.

In operation, the parts remain in the "rest" position shown in FIGS. 2 and 3, while the vehicle travels down the road and before the brakes are applied. When the brake pedal 15 is applied to cause the master cylinder assembly 14 to pressurize the line 16, hydraulic pressure is suddenly increased at the inlet port 22 and in the chamber 39. This pressure is reflected through cross ports 32 and 33 into the longitudinal passage 30 in the stem 24 and is thus applied against the head of the piston 70 in bore 69 to initiate movement of the stem 24 toward the right. At the same time, this hydraulic pressure in chamber 39 is communicated to the high pressure chamber 86 through passage 89, and any excess pressure is relieved by downward movement of the post 84 out of the chamber 86, opposed by air pressure in the space 91 under the diaphragm 81. Pressure is also communicated through passage 27 and outlet 22 through hydraulic lines 18 leading to the wheel cylinders 10–12. The brake assemblies at each wheel are thus applied and cause the vehicle to decelerate. This decelerating motion causes the pendulum 45 to swing by inertia and to move from the position shown in FIGS. 2 and 3 to the position shown in FIG. 5. This movement is communicated through the rollers 50, 51 to the flange 52 on the stem 24, causing the stem 24 to move to the position shown in FIG. 5 wherein the cross bores 32 and 33 pass under the inner peripheral sealing lip of the sealing cup 36, cutting off communication between the master cylinder assembly 14 and the wheel-cylinder assemblies 10–12. The hydraulic pressure in the lines 18 and wheel-cylinder assemblies remains at the same intensity during further deceleration of the vehicle and while the force on the brake pedal 15 is maintained. This intensity is chosen at a value below that which will cause "lockup" of any of the wheels, and therefore the wheels continue turning during deceleration, but with maximum braking effect, and without causing a skid. When pressure against the foot pedal 15 is relaxed, the hydraulic pressure in the line 16 from the master cylinder assembly falls, and hydraulic pressure in the bore 39 also falls because the cup 36 seals only in one direction, and allows escape of hydraulic fluid from port 22 to port 21. Spring 59 then moves the stem 24 to the left, causing cross bores 33 to move into communication with the chamber 39, and thereby permit full relaxation of pressure in the hydraulic lines 18. The braking effort ceases, the deceleration ends, and the pendulum 45 returns by spring and gravity means to its initial position.

In the modified form of the invention shown in FIGS. 6–9, the pendulum device does not directly actuate the valve which selectively blocks flow between the master cylinder and the wheel cylinders, but instead the pendulum device closes electrical contacts which serve to operate the valve or valves electrically. As shown in FIG. 6, the plunger 100 which is actuated by the brake pedal operates the master cylinder assembly 14a. Two valve assemblies 101 and 102 are employed, and these are substantially duplicates. The valve assembly 101 has an outlet port 103 connected to hydraulic lines leading to the front wheel-cylinder assemblies, and the valve assembly 102 has an outlet port 103 connected to hydraulic lines leading to the rear wheel-cylinder assemblies of the vehicle. Each of these valve assemblies is mounted on the master cylinder assembly 14a. Inlet port 104 delivers hydraulic fluid under pressure to the valve assembly 101, and a similar port 105 delivers hydraulic fluid from the master cylinder assembly 14a to the valve assembly 102.

Each of the valve assemblies is provided with a stationary body 106 having a bore 107 forming a pressure chamber 108. A stem 110 is mounted to slide in the body and is sealed by a pair of resilient seal rings 111 and 112 spaced by a spring 113. Cross bores 115 and 116 in the stem 110 communicate with the chamber 108 and with the longitudinal passageway 117 in the stem 110. In the position of the parts shown in FIG. 9, hydraulic pressure admitted into the chamber 108 from the master cylinder assembly 14a is communicated through the cross bores 115 and 116 and through the longitudinal passageway 117 into the chamber 118 within the body 106. The outlet from this chamber 118 is through port 103.

An electrical solenoid 120 has a movable armature 121 attached at 122 to the stem 110. When the solenoid winding is energized by means of the electrical lead wires 124 and 125, the armature 121 is moved to the left, as viewed in FIG. 9, to compress the coil spring 126. This movement shifts the stem 110 to move the cross bores 115 and 116 under the inner sealing lip of the U-shaped seal ring 111, thereby cutting off communication from the inlet 105 to the chamber 118.

The pendulum 130 is constructed and mounted in the manner previously described, and is pivotally supported on the case 131 by means of the pivot shaft 132. Rollers 133 and 134 carried on the pendulum 130 are positioned between the flanges 135 and 136 on the rod 137. This rod is mounted to slide on the case 131 in a direction parallel with the longitudinal axis of the vehicle. When the vehicle decelerates, the pendulum 130 swings by inertia in a counterclockwise direction, as viewed in FIG. 7, and causes the leaf spring elements 140 and 141 mounted on the pendulum 130 to engage the stationary electrical contacts 142 and 143, respectively. The contacting parts may be adjusted to close at the same instant, although one may be adjusted to close slightly ahead of the other. In this way, the cutoff of communication between the master cylinder and the front wheel cylinders may occur at a slightly different time than the cutoff with respect to the rear wheel cylinders. Closing of the contacts 140, 142 and 141, 143 closes electrical circuits which energize the solenoids 120 for each of the valve assemblies 101 and 102, when the switch 144 (FIG. 10) is closed. This switch 144 is closed when the foot pedal is depressed.

Means are provided for applying an initial push to the rod 137 to move it in the same direction as the pendulum 130, and as shown in the drawings this means comprises a solenoid 145 having an armature 146 and a rod 147 which impinges against and shifts the rod 137. This action is opposed by the springs 148 and 149. The solenoid 145 is electrically connected through staionary contact 151 and leaf spring contact 152 fixed to the pendulum 130. These contacts are normally closed, and open upon initial swinging movement of the pendulum. Accordingly, when the brake pedal is depressed, the switch 144 is closed, the solenoid 145 is energized and the rod 137 given an initial movement prior to the instant when deceleration causes swinging movement of the pendulum 130. The contacts 151 and 152 then open. They close again when the pendulum swings back to its initial position.

Each of the valve assemblies 101 and 102 may be provided with a hydraulic acculator 154 similar to that previously described but mounted at the end of the valve body 106 opposite the location of the solenoid 120. The post 155 is slidably mounted in the bore which forms the chamber 118, and this post is carried on the stiffener flange 156 attached to the center portion of the flexible diaphragm 157. Air pressure in the chamber 158 serves to oppose hydraulic pressure in the chamber 118 acting on the end of the post 155.

The operation of this electrical form of the invention will be understood from the description of the operation of the preferred embodiment, previously described.

I claim:

1. Apparatus for limiting maximum hydraulic pressure which may be applied by a master cylinder assembly to wheel-cylinder assemblies of a hydraulic brake system of a vehicle, comprising in combination: a valve device adapted to be interposed between the master cylinder assembly and the wheel-cylinder assemblies, the valve device having a stationary ported body adapted to be fixed to the vehicle and having a stem movable axially in the body for selectively blocking flow of hydraulic fluid through the valve device from the master cylinder assembly to the wheel-cylinder assemblies, intertia means including a pendulum actuated by deceleration of the vehicle for causing longitudinal movement of said stem to blocking position, the stem having axially spaced flanges, said pendulum being mounted to swing about an axis extending transversely of the vehicle and having a bifurcated portion straddling said stem at a location between said flanges, rollers on the pendulum adapted to contact said flanges for shifting said stem in response to movement of said pendulum.

References Cited

UNITED STATES PATENTS

| | | | |
|---|---|---|---|
| 2,219,041 | 10/1940 | Harvey | 188—152.04 |
| 2,317,134 | 4/1943 | McCune | 303—24 |
| 2,572,270 | 10/1951 | Majneri | 303—87 X |
| 3,188,463 | 6/1965 | Hines | 303—24 X |
| 3,245,729 | 4/1966 | Shellhause | 303—24 |
| 3,276,822 | 10/1966 | Lister et al. | 303—24 |
| 3,430,660 | 3/1969 | Mitton | 303—87 X |

MILTON BUCHLER, Primary Examiner

J. J. McLAUGHLIN, JR., Assistant Examiner

U.S. Cl. X.R.

303—6, 21, 87; 137—38; 188—152